Nov. 17, 1925.
H. N. ATWOOD
PNEUMATIC VEHICLE WHEEL
Original Filed Aug. 23, 1923
1,561,766
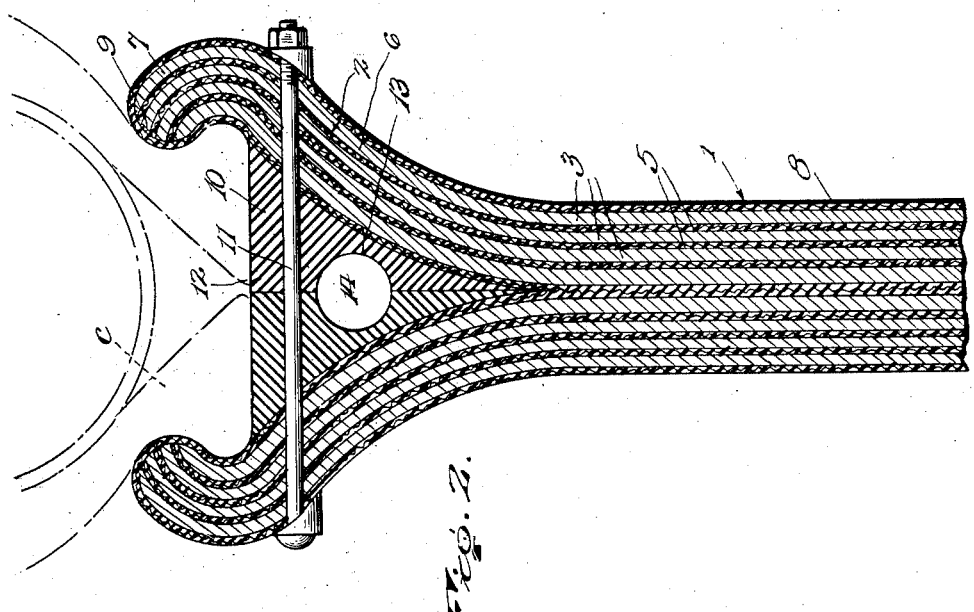
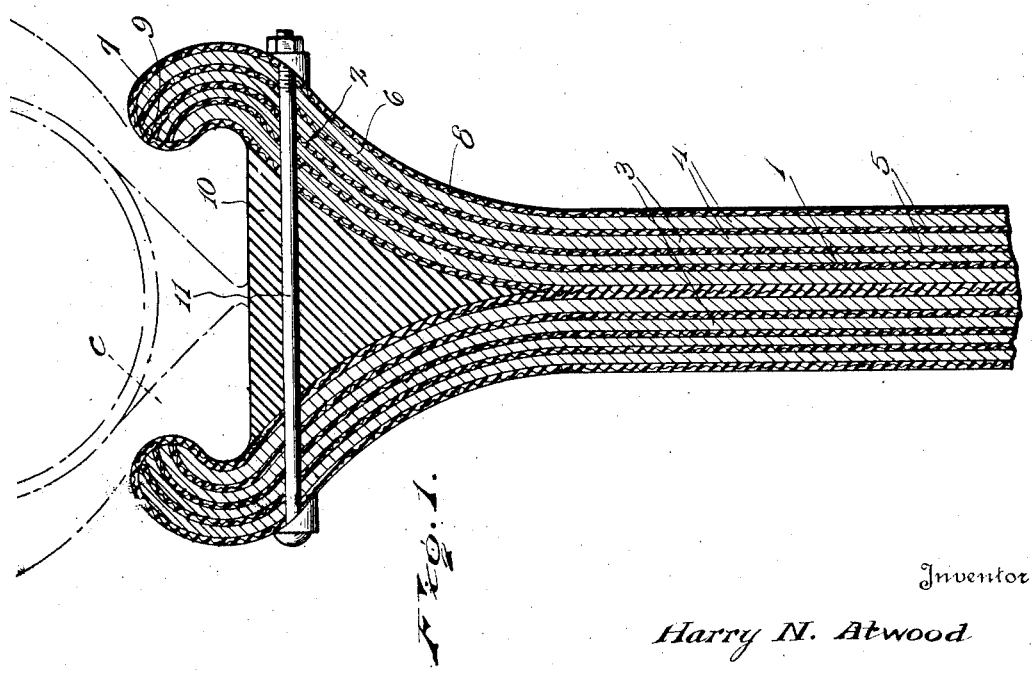
Inventor
Harry N. Atwood
By Lacy & Lacy, Attorneys Patented Nov. 17, 1925.

1,561,766

UNITED STATES PATENT OFFICE.

HARRY N. ATWOOD, OF MONSON, MASSACHUSETTS, ASSIGNOR TO RUBWOOD, INC., OF LAWRENCE, MASSACHUSETTS, A CORPORATION OF MASSACHUSETTS.

PNEUMATIC VEHICLE WHEEL.

Application filed August 23, 1923, Serial No. 658,946. Renewed February 11, 1925.

*To all whom it may concern:*

Be it known that I, HARRY N. ATWOOD, a citizen of the United States, residing at Monson, in the county of Hampden and State of Massachusetts, have invented certain new and useful Improvements in Pneumatic Vehicle Wheels, of which the following is a specification.

This invention relates to improvements in vehicle wheel bodies.

The ordinary types of vehicle wheel bodies are of rigid structure and, possessing substantially no resiliency, transmit the shocks and vibrations incident to travel over road surfaces, to the running gear and other parts of the vehicle. Furthermore, such wheel bodies are cumbersome in construction and heavy in weight and, because of the centrifugal and gyroscopic forces set up when traveling at high speed, materially interfere with ready steering of the vehicle. Furthermore, a vehicle wheel body of the ordinary type requires to be equipped with a metallic rim for the purpose of seating the tire, and means must be provided for securing this rim in place. Such wheels are therefore expensive to manufacture and equip, and the rim equipment adds materially to the weight of the wheel. In consideration of the foregoing it is the primary object of the present invention to provide a combined wheel body and rim constituting an integral whole and of composite structure, and to form the entire wheel of materials possessing such qualities and united and arranged in such a manner as to overcome the disadvantages presented by the ordinary types of wheel bodies.

Another important object of the invention is to provide a wheel body which will be resilient and therefore shock-absorbing and in which the tire seating rim will constitute an integral part with the body of the wheel so that the necessity for equipping the body with the usual metal rim and associated parts is wholly obviated and the structure is rendered lighter and the cost of production is materially reduced.

Another object of the invention is to so construct the rim portion of the wheel that there will be less likelihood of rim cutting of the tire casing in the event of deflation of the tire.

Another object of the invention is to so construct the rim portion of the wheel body that it will resiliently and yieldably seat the tire casing thereby enhancing the cushioning qualities of the tire and wheel.

In the accompanying drawings:

Figure 1 is a sectional view through a portion of a wheel constructed in accordance with the invention;

Figure 2 is a similar view illustrating a slight modification.

The body of the wheel is indicated in general by the numeral 1 and the tire casing seating rim by the numeral 2. The body 1 is preferably made up of two sections indicated by the numeral 3 and each in turn comprising a plurality of plies 4 of veneer or other suitable body material and bonding plies 5 or rubber, rubberized fabric, or similar material. In preparing each section 3, the required number of body and bonding plies are assembled, the plies being alternated. Either prior to or after assemblage, the body plies 4 are given the form shown in the drawings, the outer peripheral portions of the plies being curved or dished in an outward direction as indicated by the numeral 6 and thence turned inwardly near their margins as indicated by the numeral 7, the outwardly deflected portions constituting sustaining shoulders, and the inturned portions 7 constituting clincher flanges for engagement with the beads of the ordinary tire casing which is shown in a general way in the drawings and indicated by the reference letter C. A facing ply 8 of rubberized fabric or any other material found suitable for the purpose is applied over the outer and inner faces of each of the sections 3 and extends likewise over the edge of the inturned peripheral portion 7 of the section, this edge being preferably transversely rounded as indicated by the numeral 9. The two sections 3 are then assembled face to face with their mid portions in contact, and a cushioning filling 10 of soft rubber is applied within the circumferential channel defined by the opposing faces of the outwardly deflected portions 6 of the two sections, the filling being so applied that it will constitute a seat for a tire casing, the beads of which are engaged by the inturned portions 7 of the sections 3.

After the wheel sections 3 have been placed together in the manner stated and the filling 10 has been applied, the entire structure may be subjected to a process of vulcanization so as to cure the rubber constituents thereof and effect an intimate and integral bonding of all of the constituent parts. If desired bolts 11 may be secured through the shoulder portions 6 of the body sections to positively insure against any relative spreading of these portions and the inturned clincher portions 7.

The form of the invention shown in Figure 2 of the drawings is identical with that shown in Figure 1, except that the filling corresponding to the filling 10 and indicated by the numeral 12 is preferably molded in two halves which are provided in their opposing faces with matching annular grooves 13, which, when the parts are assembled, define an annular air chamber indicated by the numeral 14.

From the foregoing description of the invention it will be evident that in both embodiments and in any embodiment falling within the scope of the appended claims, the wheel body possesses resiliency throughout all of its portions, and as a whole has shock-absorbing qualities which are absent in wheel bodies of ordinary construction. Thus while the mid portion of the body of the wheel is sufficiently stable to sustain the weight of the vehicle without any distortion, it is at the same time sufficiently resilient and yieldable to enable it to absorb the shocks, vibrations, and impacts to which the wheel will be subjected in use so that these forces, by the time they are transmitted to the running gear of the vehicle, are greatly diminished. The wheel is adapted for the application thereto of any standard tire casing, and the casing will be more firmly and securely seated than where a metal rim is employed as in the ordinary structures. Furthermore, the filling of soft rubber constitutes a backing or yieldable and resilient foundation for the tire casing so that the cushioning qualities of the wheel are materially enhanced. Also by rounding the edges 9 of the inturned portions 7 of the body sections, cutting of the tire casing and inner tube, in the event of deflation, is effectually prevented, or at least the likelihood of this damage to the casing and tube is greatly minimized.

Having thus described the invention, what is claimed as new is:

1. A vehicle wheel comprising a body and a tire seating rim constituting an integral structure and made up of plies of resilient body material and plies of intervening bonding material, and a seating cushion for the tire extending circumferentially of the structure within the rim.

2. A vehicle wheel comprising a body and a tire seating rim constituting an integral structure of resilient material, and a seating cushion within the rim extending circumferentially of the structure.

3. A vehicle wheel comprising a body and a tire seating rim constituting an integral structure of resilient material, and a seating cushion within the rim extending circumferentially of the structure and integrally bonded thereto.

4. A vehicle wheel comprising a body and tire seating rim constituting an integral structure and made up of plies of veneer and intervening bonding plies of rubber material, and a cushion of soft rubber extending circumferentially within the rim and constituting a yieldable sustaining means for a tire seated in the rim.

5. A vehicle wheel comprising a body and tire seating rim constituting an integral structure and made up of sections each comprising a plurality of resilient body plies and intervening bonding plies, the peripheral portions of the sections being dished to extend apart and define the side walls of the rim, and a cushion of soft rubber within the channel of the rim extending circumferentially of the structure and constituting a yieldable cushioning seat for a tire mounted in the channel of the rim.

6. A vehicle wheel comprising a body and tire seating rim constituting an integral structure and made up of sections each comprising a plurality of resilient body plies and intervening bonding plies, the peripheral portions of the sections being dished to extend apart and define the side walls of the rim, and a cushion of soft rubber within the channel of the rim extending circumferentially of the structure and constituting a yieldable cushioning seat for a tire mounted in the channel of the rim, the peripheral portions of the sections having their margins turned inwardly toward each other to provide clincher flanges.

7. A vehicle wheel comprising a body and tire seating rim constituting an integral structure and made up of sections each comprising a plurality of resilient body plies and intervening bonding plies, the peripheral portions of the sections being dished to extend apart and define the side walls of the rim, and a cushion of soft rubber within the channel of the rim extending circumferentially of the structure and constituting a yieldable cushioning seat for a tire mounted in the channel of the rim, the peripheral portions of the sections having their margins turned inwardly toward each other to provide clincher flanges and being transversely rounded.

8. A vehicle wheel comprising a body and tire seating rim constituting an integral structure and made up of sections each comprising a plurality of resilient body plies and intervening bonding plies, the peripheral portions of the sections being dished to extend apart and define the side walls of the rim, a cushion of soft rubber within the channel of the rim extending circumferentially of the structure and constituting a yieldable cushioning seat for a tire mounted in the channel of the rim, the peripheral portions of the sections having their margins turned inwardly toward each other to provide clincher flanges and being transversely rounded, and a facing of rubber material extending over the outer surfaces of the sections and over the said clincher flanges.

9. A vehicle wheel comprising a body and a tire seating rim constituting an integral structure and made up of plies of resilient body material and plies of intervening bonding material, and a cushion of soft rubber extending circumferentially about the structure within the channel of the rim and having an annular air chamber, the said cushion constituting a sustaining means for a tire mounted in the channel of the rim.

In testimony whereof I affix my signature.

HARRY N. ATWOD. [L. S.]